(12) United States Patent
Velipasaoglu (10) Patent No.: US 8,918,389 B2
(45) Date of Patent: Dec. 23, 2014

(54) DYNAMICALLY ALTERED SEARCH ASSISTANCE

(75) Inventor: Omer Emre Velipasaoglu, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/182,439

(22) Filed: Jul. 13, 2011

(65) Prior Publication Data

US 2013/0018872 A1 Jan. 17, 2013

(51) Int. Cl.
  *G06F 17/30* (2006.01)

(52) U.S. Cl.
  CPC .................................. *G06F 17/3097* (2013.01)
  USPC ........................................................ 707/723

(58) Field of Classification Search
  None
  See application file for complete search history.

(56) References Cited

U.S. PATENT DOCUMENTS

| | | | |
|---|---|---|---|
| 7,797,635 B1 * | 9/2010 | Denise ........................... | 715/738 |
| 8,005,823 B1 * | 8/2011 | Marshall et al. .............. | 707/721 |
| 2006/0224579 A1 * | 10/2006 | Zheng ................................ | 707/5 |
| 2008/0256061 A1 * | 10/2008 | Chang et al. ....................... | 707/5 |
| 2009/0228799 A1 * | 9/2009 | Verbeeck et al. ............ | 715/727 |
| 2011/0066618 A1 * | 3/2011 | Sigurbjornsson et al. .... | 707/739 |

OTHER PUBLICATIONS

Moens, Marie-Francine, et al. "Measuring Aboutness of an Entity in a Text," Workshop on TextGraphs, at HLT-NAACL 2006, p. 25-28, New York City, Jun. 2006.*

* cited by examiner

*Primary Examiner* — Jay Morrison
(74) *Attorney, Agent, or Firm* — Martine Penilla Group, LLP (57) ABSTRACT

Search-engine software displays a group of search results in a graphical user interface (GUI) for a search engine. The search-engine software captures positive feedback and negative feedback as to the search results from a user. Then the search-engine software determines a collective aboutness signature for the search results associated with the positive feedback and a collective aboutness signature for search results associated with the negative feedback. The search-engine software obtains a score of similarity to each of the collective aboutness signatures for a representation of each query suggestion in a group of query suggestions. Then the search-engine software separates the scored query suggestions into two or more groups, based on the similarity scores, and displays query suggestions from the groups in the GUI.

20 Claims, 6 Drawing Sheets

DYNAMICALLY ALTERED SEARCH ASSISTANCE

BACKGROUND

A search engine provides assistance for matching a user's intent to a topic both at the time of query formulation and following submittal of a query. The former assistance often takes the form of auto-completion of a query during query formulation. The latter assistance often takes the form of post-submittal query suggestions. Such a query suggestion is least useful when it yields the same search results that the user has explored already.

Typically, a search engine selects candidates for post-submittal query suggestions based on query frequencies. The search engine then eliminates candidates that would result in co-clicks on similar uniform resource locators (URLs). While this approach is defensible as being consistent with a correct utility model, it is reactive rather than proactive.

SUMMARY

In an example embodiment, a processor-executed method is described for displaying suggested queries for web searching. According to the method, search-engine software receives a user query as an input. The search-engine software fetches a group of search results, based on the user query, and determines a collective aboutness signature for the group of search results. Then for a representation of each query suggestion in a group of query suggestions that are ranked, the search-engine software obtains a score of similarity to the collective aboutness signature. The search-engine software re-ranks the query suggestions, based on the scores, and displays the re-ranked query suggestions in a graphical user interface (GUI) for a search engine.

Another example embodiment also involves a processor-executed method for displaying suggested queries for web searching. According to the method, search-engine software displays a group of search results in a GUI for a search engine. The search-engine software captures positive feedback and negative feedback as to the search results from a user. The search-engine software determines a collective aboutness signature for the search results associated with the positive feedback and a collective aboutness signature for search results associated with the negative feedback. Then for a representation of each query suggestion in a group of query suggestions that are ranked, the search-engine software obtains a score of similarity to each of the collective aboutness signatures. Then the search-engine software separates the scored query suggestions into two or more groups, based on the similarity scores, and displays query suggestions from the groups in the search engine GUI.

Another example embodiment involves a processor-executed method for displaying filters for web searching. According to the method, search-engine software displays a group of search results in a GUI for a search engine. The search-engine software captures positive feedback and negative feedback as to the search results from a user. Then search-engine software determines a collective aboutness signature for search results associated with the positive feedback and a collective aboutness signature for search results associated with the negative feedback. For a representation of each criterion in a group of criteria for a filter for web searching, the search-engine software obtains a score of similarity to each of the collective aboutness signatures. Then the search-engine software displays criteria for the filter in the GUI, based on the scores.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
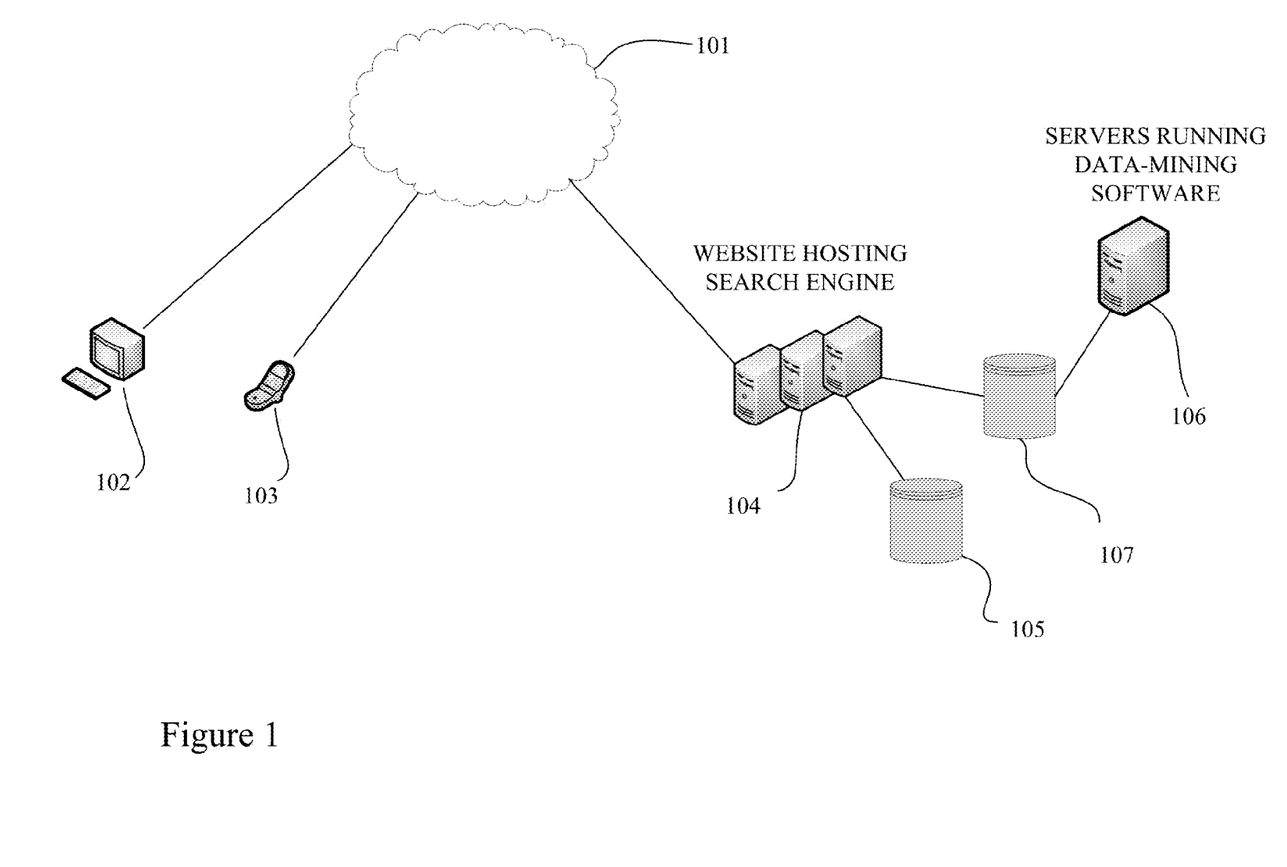
FIG. 1 is a simplified network diagram that illustrates a website hosting a search engine, in accordance with an example embodiment.

FIG. 1 is a simplified network diagram that illustrates a website hosting a search engine, in accordance with an example embodiment. As depicted in this figure, a personal computer 102 (which might be a laptop or other mobile computer) and a mobile device 103 (e.g., a smartphone such as an iPhone, Blackberry, Android, etc.) are connected by a network 101 (e.g., a wide area network (WAN) including the Internet, which might be wireless in part or in whole) with a website 104 hosting a search engine. In an example embodiment, the website 104 is composed of a number of servers connected by a network (e.g., a local area network (LAN) or a WAN) to each other in a cluster or other distributed system which might execute distributed-computing software such as Map-Reduce, Google File System, Hadoop, Pig, etc. The servers are also connected (e.g., by a storage area network (SAN)) to persistent storage 105 and persistent storage 107. In an example embodiment, persistent storage 105 and 107 might include a redundant array of independent disks (RAID).

In an example embodiment, persistent storage 105 which might be used to store search results, web documents, or other data related to web searching and persistent storage 107 might be used to store query logs and query suggestions generated from the query logs by a cluster of servers 106. However, in an alternative example embodiment, persistent storage 105 and persistent storage 107 might both store search results, web documents, query logs, and query suggestions, e.g., server cluster 106 might be a part of website 104.

Personal computer 102 and the servers in website 104 and cluster 106 might include (1) hardware consisting of one or more microprocessors (e.g., from the x86 family or the PowerPC family), volatile storage (e.g., RAM), and persistent storage (e.g., a hard disk), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computer 102 and mobile device 103 might each include a browser as an application program or part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and Palm webOS Browser. It will be appreciated that users of personal computer 102 and mobile device 103 might use browsers to communicate with search-engine software running on the servers at website 104. Examples of website 104 include a website that is part of google.com, bing.com, ask.com, yahoo.com, and blekko.com, among others.

In an example embodiment, server cluster 106 might execute data-mining software which might include (a) machine-learning software and/or (b) distributed-computing software such as Map-Reduce, Google File System, Hadoop, Pig, etc. For example, the data-mining software might receive query logs from persistent storage 107 as inputs and transmit query suggestions to persistent storage 107 as outputs. From there, the query suggestions might be accessed in real-time or near real-time by search-engine software at website 104 and transmitted to personal computer 102 and/or mobile device 103 for display in a graphical user interface (GUI) presented by a browser.

Figure 2:
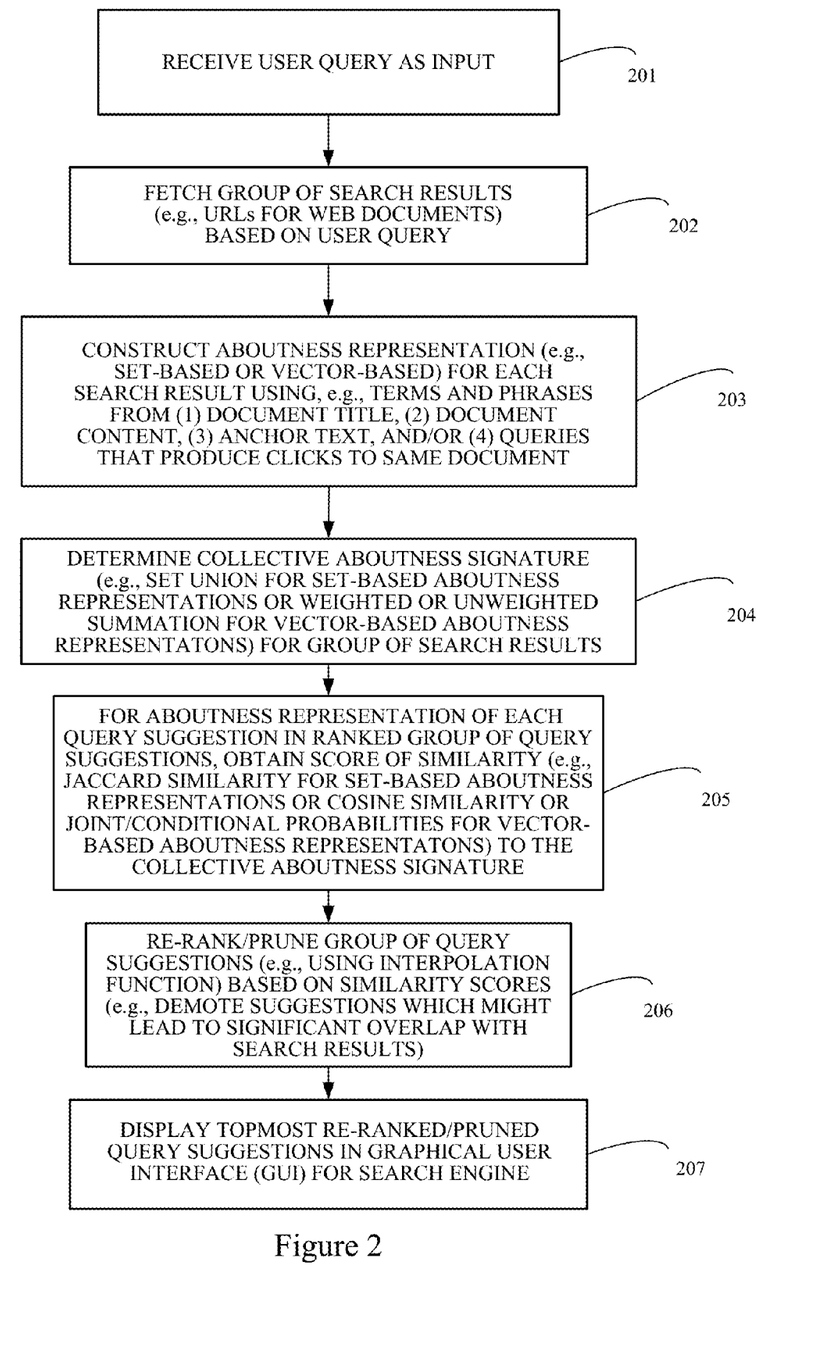
FIG. 2 is a flowchart diagram that illustrates a process for re-ranking post-submittal query suggestions prior to results-page rendering, in accordance with an example embodiment.

FIG. 2 is a flowchart diagram that illustrates a process for re-ranking post-submittal query suggestions prior to results-page rendering, in accordance with an example embodiment. In an example embodiment, this process might be performed by the search-engine software running on server cluster 104 with access to the search results and web documents stored on persistent storage 105 and query suggestions stored on persistent storage 107. However, in an alternative example embodiment, this process might be performed by client search-engine software running on personal computer 102 or mobile device 103, e.g., as a plug-in for a browser.

As depicted in FIG. 2, the search-engine software receives a user query as an input, e.g., reads the user query from an edit box in a graphical user interface (GUI) presented by a browser, in operation 201. In operation 202, the search-engine software fetches a group of search results (e.g., URLs for web documents) based on the user query. Then in operation 203, the search-engine software constructs an aboutness representation that can be leveraged mathematically (e.g., set-based or vector-based) for each of the search results using, e.g., terms and phrases from, e.g., (1) the document title, (2) the document content, (3) the anchor text, and/or (4) queries that produce clicks to same document.

In operation 204 of the process depicted in FIG. 2, the search-engine software determines a collective aboutness signature (e.g., set union or weighted or unweighted summation of vectors) for the group of search results, using the individual aboutness representations for each of the search results. For an aboutness representation of each query suggestion in a ranked group of query suggestions, the search-engine software obtains a score of similarity (e.g., Jaccard similarity for a set-based aboutness representation or cosine similarity or joint/conditional probabilities for a vector-based aboutness representation) to the collective aboutness signature, in operation 205. Then in operation 206, the search-engine software re-ranks/prunes the group of query suggestions based on the similarity scores (e.g., demotes or eliminates suggestions which might lead to significant overlap with search results). In an example embodiment, the search-engine software might use an interpolation function (e.g., bilinear or other linear interpolation or even nonlinear interpolation) to perform the re-ranking/pruning to account for both a query suggestion's initial ranking and its similarity score. The search-engine software then displays the topmost re-ranked/pruned query suggestions in a graphical user interface (GUI) presented in a browser, in operation 207.

It will be appreciated that "aboutness" is a term of art in the field of information retrieval in general and search-engine information retrieval in particular. Qualitatively, one might think of "aboutness" as a measure of topic distribution. The aboutness described in this disclosure is built from verbal descriptions, in the form of terms and phrases, by various stakeholders in a search-engine retrieval process. Thus, queries are a search-engine user's verbal description of a document (e.g., a web page). A document's title and a document's content are an authors' verbal description of a document. And anchor text is a webmaster's verbal description of another document.

Quantitatively, aboutness might be represented as a set, e.g., a "bag" of terms or phrases, in an example embodiment. Set operations such as union might be performed on such sets to determine a collective aboutness signature. And the similarity between sets might be calculated using measures such as Jaccard similarity.

In an alternative example embodiment, aboutness might be represented as a vector, either weighted or un-weighted. In an un-weighted vector, the presence or absence of a term or phrase from a lexicon (e.g., a dictionary or vocabulary) might be represented with a one or a zero. In a weighted vector, numerical weights for each term or phrase from a lexicon might represent (1) the importance of the term or phrase or (2) the probabilities (e.g., of a document view and/or URL click or, more generally, that an intent that produces a document uses a particular term or phrase) resulting from a language model. In an example embodiment, both weighted and un-weighted aboutness vectors might be constructed and indexed offline (e.g., prior to rendering of the search results page) and stored in a database. Likewise aboutness vectors for queries that have been seen an acceptable number of times might be constructed and indexed offline and stored in a database, e.g., with query logs or query suggestions.

Additionally, weighted or un-weighted summation might be performed to determine a collective aboutness signature from individual aboutness vectors. In an example embodiment, weighted summation of aboutness vectors might be based on rank or might involve inflating or deflating weights for isolated terms or phrases. And similarity between two vectors might be calculated using measures such as (1) cosine similarity or (2) estimates of joint or conditional probabilities if the vectors' weights represent probabilities.

In an example embodiment, the size of a vector might be reduced by modifications to the lexicon that is used to create the vector. For example, stop words, e.g., as determined using tf-idf (term frequency-inverse document frequency), might be eliminated from the lexicon. Or all words with a low idf might be eliminated from the lexicon. Alternatively, the lexicon might consist of a prior distribution of terms and phrases culled from crawling the Web (e.g., as described in co-owned U.S. Published Patent Application No. 2009/0254512 which discusses Peter Anick's Prisma technology) or related to a specific topic. Or, the vectors used might be truncated without modifying the lexicon, e.g., using a pre-determined vector size for client search-engine software (e.g., a browse plug-in) or even server search-engine software.

In operation 205 of the process depicted in FIG. 2, the search-engine software obtains a similarity score to a collective aboutness signature for an aboutness representation of each query suggestion in a ranked group of query suggestions. In an example embodiment, the ranked group of query suggestions might be augmented with ranked query suggestions from queries submitted earlier in a session by the same user. Also, in an example embodiment, the aboutness representation for a query suggestion might be based on or consist of the query suggestion's terms and phrases. In an alternative example embodiment, the aboutness representation for a query suggestion might be a collective aboutness signature for the results returned by the query suggestion. Here again, weighted and un-weighted aboutness vectors for such results might be constructed and indexed offline (e.g., prior to rendering of the search results page) and stored in a database.

In operation 206, the search-engine software re-ranks/prunes the group of query suggestions based on the similarity scores. In an example embodiment, a goal of the re-ranking/pruning might be a group of query suggestions that are more complementary to the search results displayed to the user. As used in this context, the term "complimentary" means that the re-ranked/pruned query suggestions will (1) return search results that are similar to but not the same as the displayed search results and (2) include search results that are under-represented or not represented at all.

Figure 3:
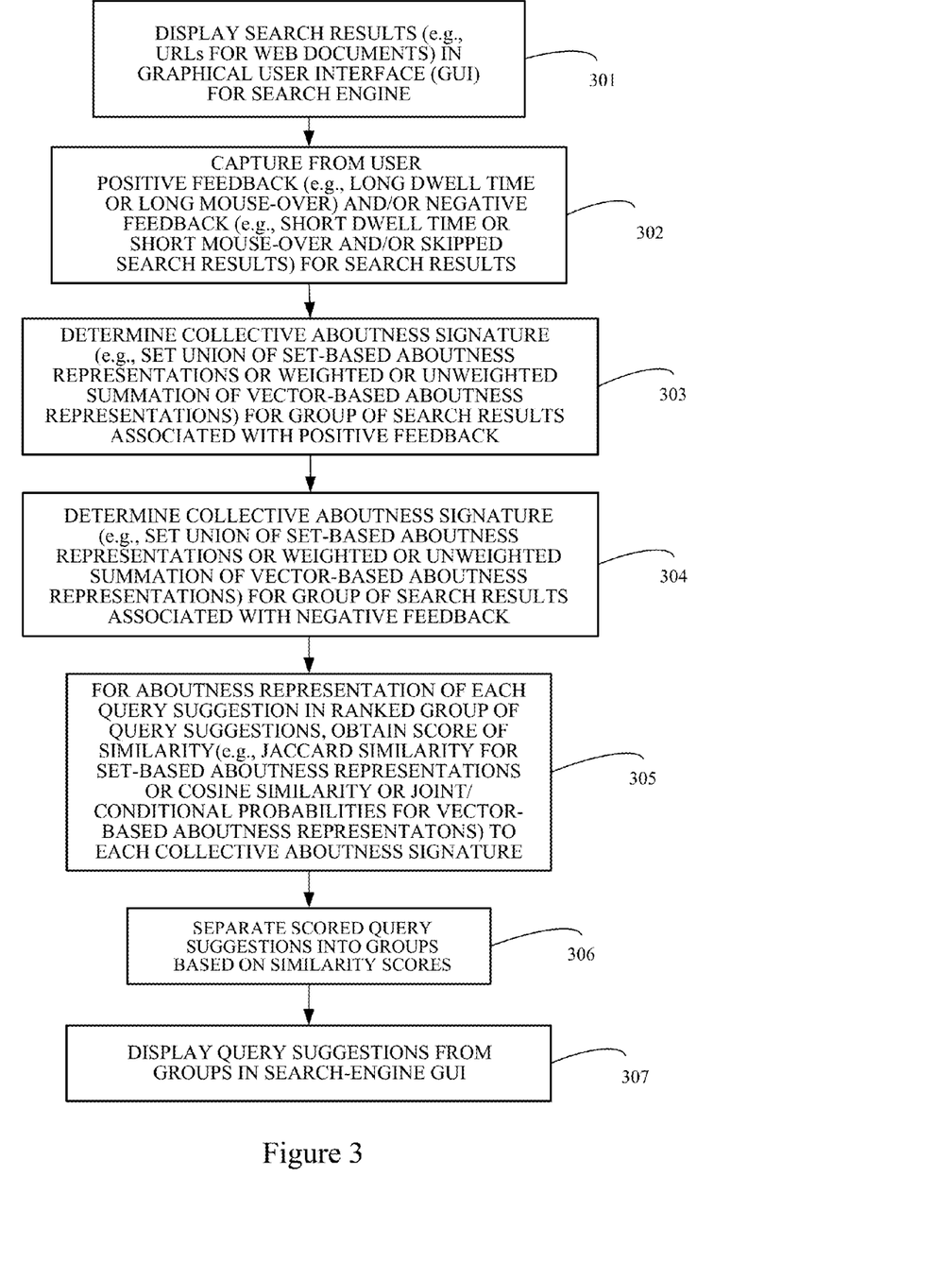
FIG. 3 is a flowchart diagram that illustrates a process for displaying post-submittal query suggestions based on relevance feedback, in accordance with an example embodiment.

FIG. 3 is a flowchart diagram that illustrates a process for displaying post-submittal query suggestions based on relevance feedback, in accordance with an example embodiment. Here again, in an example embodiment, this process might be performed by the search-engine software running on server cluster 104. However, in an alternative example embodiment, this process might be performed by client search-engine software running on personal computer 102 or mobile device 103, e.g., as a plug-in for a browser.

As depicted in FIG. 3, the search-engine software displays search results (e.g., URLs for web documents) in a GUI for a search engine, in operation 301 of the process. In operation 302, the search-engine software captures from a user positive feedback (e.g., long dwell time or long mouse-over) and/or negative feedback (e.g., short dwell time or short mouse-over and/or skipped search results) for the search results. Then in operation 303, the search-engine software determines a collective aboutness signature (e.g., set union of set-based aboutness representations or weighted or unweighted summation of vector-based aboutness representations) for a group of search results associated with positive feedback. And in operation 304, the search-engine software determines collective aboutness signature (e.g., set union of set-based aboutness representations or weighted or unweighted summation of vector-based aboutness representations) for a group of search results associated with negative feedback. For an aboutness representation of each query suggestion in a ranked group of query suggestions, the search-engine software obtains a score of similarity (e.g., Jaccard for a set-based aboutness representation or cosine similarity or joint/conditional probabilities for a vector-based aboutness representation) to each collective aboutness signature, in operation 305. That is to say, the search-engine software calculates a positive and a negative similarity score for each query suggestion. Here again, the ranked group of query suggestions might be augmented with ranked query suggestions from queries submitted earlier in a session by the user. Then in operation 306, the search-engine software separates the scored query suggestions into groups based on similarity scores. The search-engine software displays query suggestions from the groups in a search-engine GUI, in operation 307.

In operation 302 of the process depicted in FIG. 3, the search-engine software captures from a user positive and/or negative feedback for the displayed search results (e.g., URLs). In an example embodiment, the search-engine software might associate a search result with positive feedback if the a user clicks on the search result's URL and views the corresponding web page for a duration that is greater than or equal to some duration in the range of 10-100 seconds, say 60 seconds. Similarly, in an example embodiment, the search engine might associate a search result with negative feedback if a user "skips over" a search result in a list of search results or if a user clicks on a search result's URL and views the corresponding web page for a duration that is less than or equal to some duration in the range of 10-100 seconds, say 10 seconds.

In operation 306 of the process depicted in FIG. 3, the search-engine software separates the scored query suggestions into groups based on similarity scores. In an example embodiment, the search-engine software might classify query suggestions as similar to a user's intent if the query suggestion's positive similarity score is greater than the query suggestion's negative similarity score, when multiplied by a normalization factor. The normalization factor might be weighted in order to break ties in the event that a query suggestion's positive similarity score is equal to a query suggestion's negative similarity score. Alternatively, in the case of a tie, query suggestions might be randomly assigned to one of the two classifications. All other query suggestions might be classified as dissimilar to the user's intent. Then in operation 307, the search-engine software might display the top K query suggestions in the group classified as similar to a user's intent and the top L query suggestions in the group classified as dissimilar to the user's intent.

For example, the search-engine software might display 8 query suggestions in the group classified as similar to a user's intent and 2 query suggestions in the group classified as dissimilar to the user's intent. It will be appreciated that the latter query suggestions might be thought of as a form of divergence by design that prevents premature convergence on a suboptimal set of search results.

In an example embodiment, the process shown in FIG. 3 might be modified to capture only negative feedback (e.g., skipped search results that preceded a clicked search result). In such an example embodiment, the search-engine software might display re-ranked/pruned query suggestions in real-time or near real-time. Likewise, in another example embodiment, the process shown in FIG. 3 might be modified to capture only positive feedback.

In an alternative embodiment, the normalization factor and/or the integer values K and L might be based on a confidence signal related to feedback from the user, e.g., a skipped URL, a clicked URL, or dwell time. Thus, if 9 out 10 search results (e.g., URLs) are skipped and 1 out 10 search results are clicked, 9 query suggestions might be selected from the group classified as dissimilar to the user's intent and 1 query suggestion might be selected from the group classified as similar to the user's intent.

In an alternative example embodiment, the search-engine software might use classifications other than similar to the user's intent and dissimilar to the user's intent. For example, the search-engine software might use classifications based on a confidence signal related to feedback from the user, in addition to a normalization factor and/or integer values (e.g., K and L) based on such a confidence signal. In such an example embodiment, the search-engine software might select K, L, and M query suggestions from classifications of short dwell time, medium dwell time, and long dwell time respectively, where K is less than L and L is less than M.

In another alternative example embodiment, the search-engine software might use classifications, normalization factors, and/or integer values based on user models such as "infinite patience" or "finite utility".

Figure 4:
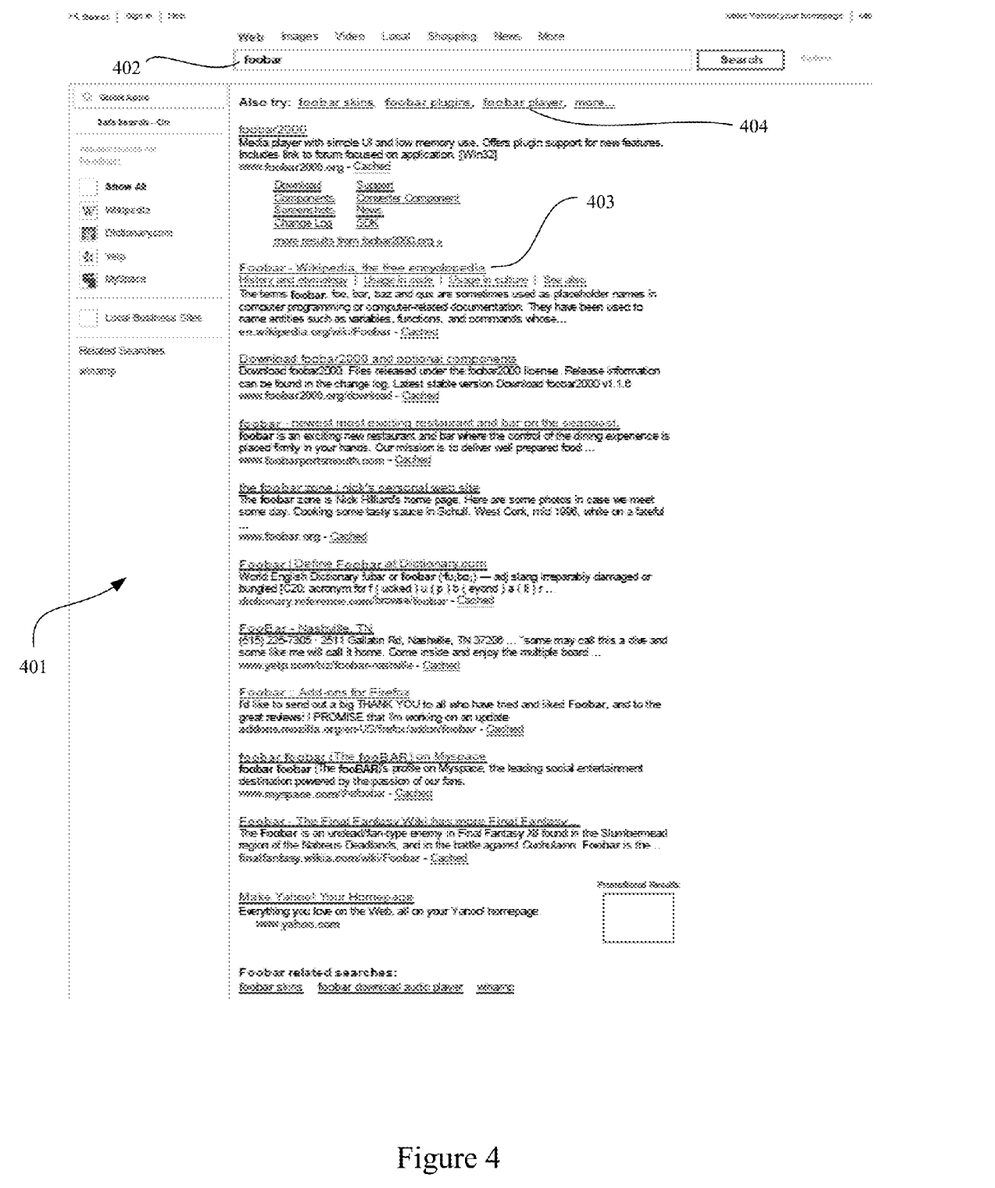
FIG. 4 shows a search results page with post-submittal query suggestions, in accordance with an example embodiment.

FIG. 4 shows a search results page with post-submittal query suggestions, in accordance with an example embodiment. As depicted in this figure, a search results page 401 includes a text box which displays the query 402 (namely the term "foobar") that a user submitted and that was processed by a search engine. The results of that processing include result 403, which consists of an annotated hyperlink or URL (namely, the phrase "Foobar—Wikipedia, the free encyclopedia"). Also displayed on search results page 401 are query suggestions, including query suggestion 404 (namely, the phrase "foobar player"). In an example embodiment, the processes described in FIG. 3 or FIG. 4 might result in such a query suggestion.

Figure 5:
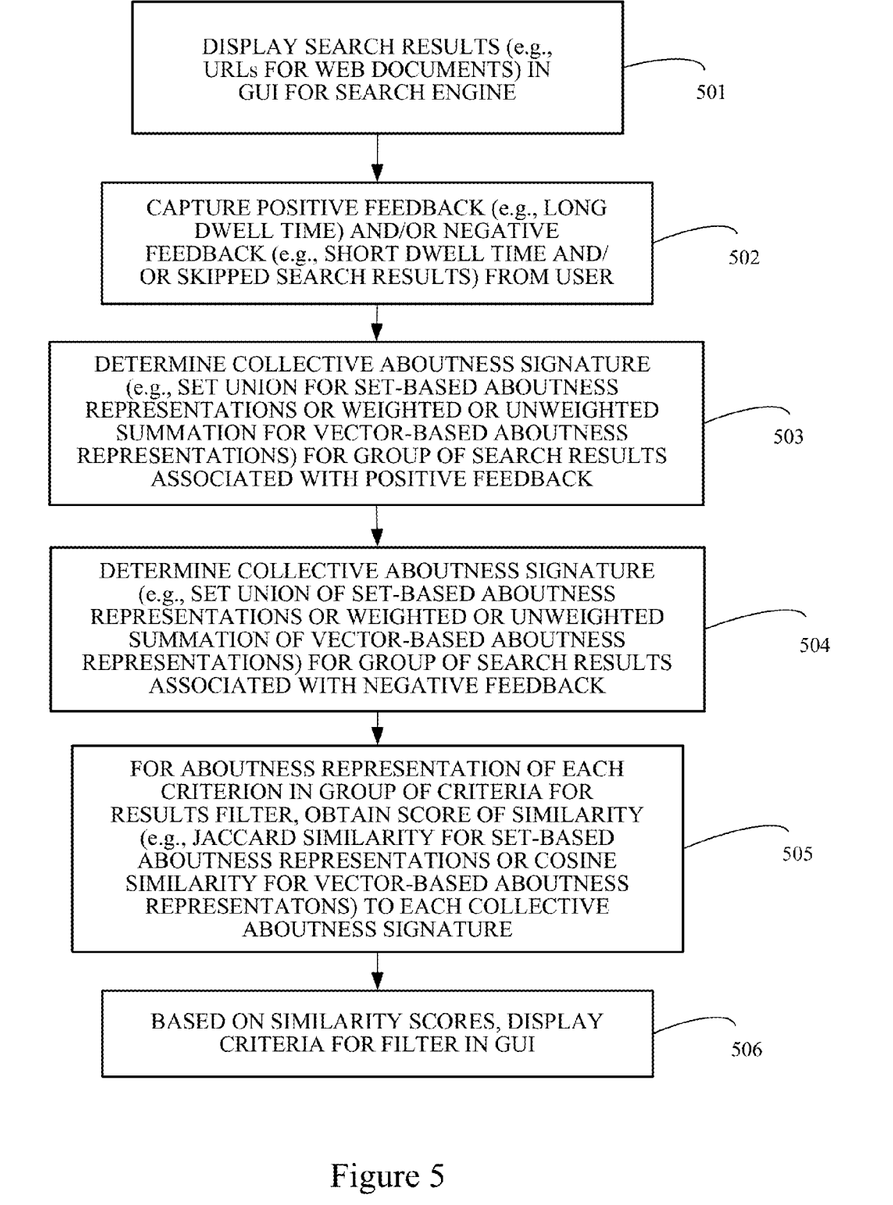
FIG. 5 is a flowchart diagram that illustrates a process for displaying filter criteria based on relevance feedback, in accordance with an example embodiment.

FIG. 5 is a flowchart diagram that illustrates a process for displaying filter criteria based on relevance feedback, in accordance with an example embodiment. As depicted in FIG. 5, the search-engine software displays search results (e.g., URLs for web documents) in a GUI for a search engine, in operation 501 of the process. In operation 502, the search-engine software captures from a user positive feedback (e.g., long dwell time or long mouse-over) and/or negative feedback (e.g., short dwell time or short mouse-over and/or skipped search results) for the search results. Then in operation 503, the search-engine software determines a collective aboutness signature (e.g., set union of set-based aboutness representations or weighted or unweighted summation of vector-based aboutness representations) for a group of search results associated with positive feedback. And in operation 504, the search-engine software determines collective aboutness signature (e.g., set union for set-based aboutness representations or weighted summation for vector-based aboutness representations) for a group of search results associated with negative feedback. For an aboutness representation of each criterion in a group of criteria for a filter for search results, the search-engine software obtains a score of similarity (e.g., Jaccard for a set-based aboutness representation or cosine similarity or joint/conditional probabilities for a vector-based aboutness representation) to each collective aboutness signature, in operation 505. That is to say, the search-engine software calculates a positive and a negative similarity score for each filter criterion. The search-engine software displays criteria for the filter in a GUI (e.g., for a filter), in operation 506.

Figure 6:
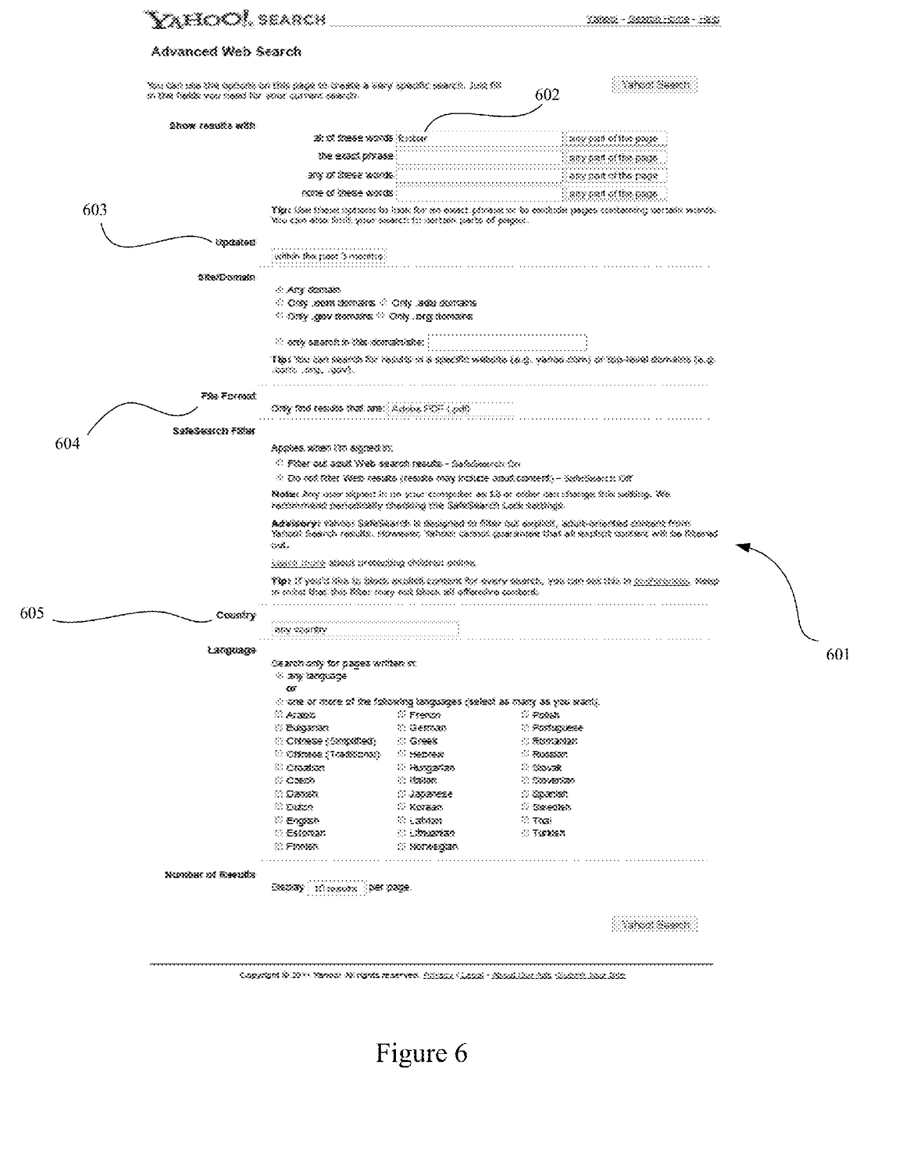
FIG. 6 shows a results filter page with criteria.

FIG. 6 shows a results filter page with criteria. As depicted in this figure, a results filter page 601 includes a text box which displays the query 602 (namely the term "foobar") entered by a user. Also displayed on results filter page 601 are filter criteria 603, 604, and 605. Filter criterion 603 allows a user to filter search results within an update period set by the user, e.g., "within the past 3 months", as depicted in FIG. 6. Filter criterion 604 allows a user to filter search results by a file format set by the user, e.g., "Adobe PDF (.pdf)", as depicted in FIG. 6. And filter criterion 605 allows a user to filter search results by a country set by the user, e.g., "any country", as depicted in FIG. 6. One or more of these filter criteria might be suppressed by the process described in FIG. 5, in an example embodiment.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the operations described above might be used for traditional query expansion, e.g., using terms and phrases associated with positive feedback for positive expansion and terms and phrases associated with negative feedback for negative expansion. Or the operations described above might even be used for query auto-completion. Alternatively, the operations described above might be used with topical synchronization and/or optimization outside the fields of search assistance and results filtering. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for displaying suggested queries for web searching, comprising the operations of:
receiving a user query as an input;
fetching a plurality of search results, based at least in part on the user query;
determining a collective aboutness signature for the plurality of search results, wherein aboutness in the collective aboutness signature depends on a lexicon and wherein the collective aboutness signature is a union or summation of an aboutness signature for each search result in the plurality of search results;

obtaining a score of similarity to the collective aboutness signature for a representation of each query suggestion in a plurality of query suggestions that are ranked;

re-ranking the query suggestions, based at least in part on the scores;

displaying one or more of the re-ranked query suggestions in a graphical user interface for a search engine, wherein each operation of the method is executed by one or more processors.

2. The method of claim 1, wherein the collective aboutness signature is a set that includes terms and phrases.

3. The method of claim 2, wherein the similarity is a Jaccard similarity.

4. The method of claim 1, wherein the collective aboutness signature is a vector that includes weights for terms and phrases.

5. The method of claim 4, wherein the similarity is a cosine similarity.

6. The method of claim 4, wherein the weights are probabilities based at least in part on a language model.

7. The method of claim 6, wherein the probabilities are joint probabilities.

8. The method of claim 6, wherein the probabilities are conditional probabilities.

9. The method of claim 1, wherein the score of similarity is calculated using a plurality of search results derived from the query suggestion.

10. A method for displaying suggested queries for web searching, comprising the operations of:

displaying a plurality of search results in a graphical user interface for a search engine;

capturing positive feedback and negative feedback as to the plurality of search results from a user;

determining a collective aboutness signature for the plurality of search results associated with the positive feedback;

determining a collective aboutness signature for the plurality of search results associated with the negative feedback;

obtaining a score of similarity to each of the collective aboutness signatures for a representation of each query suggestion in a plurality of query suggestions;

separating the scored query suggestions into two or more groups, based at least in part on the similarity scores;

displaying one or more query suggestions from one or more groups in a graphical user interface for a search engine, wherein aboutness in each collective aboutness signature depends on a lexicon, wherein each collective aboutness signature is a union or summation of an aboutness signature for each search result in the plurality of search results, and wherein each operation of the method is executed by one or more processors.

11. The method of claim 10, wherein the positive feedback includes dwell time greater than or equal to a specified duration.

12. The method of claim 10, wherein the negative feedback includes dwell time less than or equal to a specified duration.

13. The method of claim 10, wherein the negative feedback includes skipping a search result in a displayed list of search results.

14. The method of claim 10, wherein the displaying of query suggestions is based at least in part on a confidence signal.

15. The method of claim 14, wherein the confidence signal depends on a user model.

16. The method of claim 10, wherein the plurality of query suggestions includes query suggestions made during a user session.

17. A method for displaying filters, comprising the operations of:

displaying a plurality of search results in a graphical user interface;

capturing positive feedback and negative feedback as to the plurality of search results from a user;

determining a collective aboutness signature for search results associated with the positive feedback;

determining a collective aboutness signature for the plurality of search results associated with the negative feedback;

obtaining a score of similarity to each of the collective aboutness signatures for a representation of each criterion in a plurality of criteria for a filter;

displaying, based at least in part on the scores, one or more criteria for the filter in a graphical user interface, wherein aboutness in each collective aboutness signature depends on a lexicon, wherein each collective aboutness signature is a union or summation of an aboutness signature for each search result in the plurality of search results, and wherein each operation of the method is executed by one or more processors.

18. The method of claim 17, wherein the positive feedback includes dwell time greater than or equal to a specified duration.

19. The method of claim 17, wherein the negative feedback includes skipping a search result in a displayed list of search results.

20. The method of claim 17, wherein the negative feedback includes dwell time less than or equal to a specified duration.

* * * * *